(12) United States Patent
Broadbent

(10) Patent No.: US 8,340,900 B2
(45) Date of Patent: Dec. 25, 2012

(54) NAVIGATION DEVICE AND ALERTING METHOD THEREOF

(75) Inventor: Matt Broadbent, Guishan Township, Taoyuan County (TW)

(73) Assignee: Mitac International Corporation, Taoyuan County (TW)

(*) Notice: Subject to any disclaimer, the term of this patent is extended or adjusted under 35 U.S.C. 154(b) by 406 days.

(21) Appl. No.: 12/654,403

(22) Filed: Dec. 18, 2009

(65) Prior Publication Data
US 2011/0153195 A1  Jun. 23, 2011

(51) Int. Cl.
*G01C 21/00* (2006.01)
(52) U.S. Cl. ......................... 701/419; 701/431
(58) Field of Classification Search .................. 701/419, 701/428, 431
See application file for complete search history.

(56) References Cited

U.S. PATENT DOCUMENTS

| | | | |
|---|---|---|---|
| 6,208,932 B1* | 3/2001 | Ohmura et al. | 701/538 |
| 6,363,322 B1* | 3/2002 | Millington | 701/428 |
| 6,366,852 B2* | 4/2002 | Irie et al. | 701/428 |
| 7,333,889 B2* | 2/2008 | Hashizume | 701/431 |
| 7,561,703 B2* | 7/2009 | Nakamura | 381/119 |
| 2001/0007090 A1* | 7/2001 | Irie et al. | 701/211 |
| 2002/0035430 A1* | 3/2002 | Yano et al. | 701/209 |
| 2002/0198635 A1* | 12/2002 | Obradovich et al. | 701/1 |
| 2004/0030494 A1* | 2/2004 | Hull | 701/208 |
| 2006/0069500 A1* | 3/2006 | Hashizume | 701/209 |
| 2006/0080034 A1* | 4/2006 | Hayashi | 701/211 |
| 2006/0116884 A1* | 6/2006 | Itaki et al. | 704/271 |
| 2006/0190169 A1* | 8/2006 | Kawai | 701/211 |
| 2009/0070036 A1* | 3/2009 | Nakamura et al. | 701/211 |
| 2009/0164111 A1* | 6/2009 | Hosoi et al. | 701/200 |

* cited by examiner

*Primary Examiner* — Helal A Algahaim
(74) *Attorney, Agent, or Firm* — Bacon & Thomas, PLLC

(57) ABSTRACT

The present invention discloses a navigation device and the alerting method thereof. The alerting method of the navigation device comprises (a) determining a current location and a destination and displaying corresponding map information; (b) planning possible routes by computing cost of each possible route, selecting the minimum cost route as the optimized route among the possible routes, regarding other possible routes having a relatively higher cost as deviation routes; (c) computing a turning cost for each deviation route, wherein the turning cost represents cost difference between each deviation route and the optimized route respectively in an upcoming intersection, on which the possible routes are branched; (d) at a prompter location issuing a voice guidance about how to follow the optimized route, wherein if the upcoming intersection has a turning cost greater than a warning threshold, then the upcoming intersection is a decision point, and additional alertness is issued before the upcoming intersection.

13 Claims, 3 Drawing Sheets

NAVIGATION DEVICE AND ALERTING METHOD THEREOF

TECHNICAL FIELD

The present invention is related to a navigation device and an alerting method thereof, and particularly to a navigation device that issues additional warning message and an alerting method thereof.

BACKGROUND

Since the traffic geographic information is increasingly complex, and if public transit vehicle is considered, it may not satisfy everyone specific requirements because it may only arrive at any specific locations, therefore, a navigation device that directs drivers to any specific place in personal need is gradually popular. Generally, a navigation device plans optimized routes according to map information and the specific requirement such as the current location and a destination, and provides voice guidance informing the user how to follow an optimized route. The information of an optimized route consists of a series of voice guidance such as a distance to a cross road or turn-by-turn navigation instructions as well as road information such as the name of the road, the section of the road, and the type of the road. It thus allows users to drive from the current location to a destination under the users' requirement in a way of most minimal cost. However, in negligence or an emergency, users may not follow the guidance of the navigation device so as to deviate from the optimized route. Although the navigation device then still can guide the users another new optimized route based on the current location and map information, the extra cost needed remains serious. In addition to the time-cost, the cost further comprises the oil-cost and extra fee, such as the toll to pass a bridge.

Further, the deviation from the optimized route on different locations causes different results. For example, if a user ignores turning voice guidance A and thus misses an interchange in highway, the user at least needs to drive to the next interchange. Whereas a user ignores a turning voice guidance B in a small town, then the user only needs to make a U-turn or turns in the next intersection according to the new optimized route. The inconvenience caused by the two scenarios of user differs. Therefore, the importance of voice guidance within the optimized route thus makes different. Prior art treats the importance of all voice guidance as the same, so that users must judge the importance of each voice guidance by themselves. However, if users are not familiar with the local map, they can not determine the importance of each voice guidance in time. As a result, users are to neglect the voice guidance with higher importance to deviate substantially from the optimized route. Moreover, a user is difficult to consider the priority of the voice guidance when driving.

SUMMARY OF THE INVENTION

In order to solve the problems above, the inventor provides a navigation device and an alerting method thereof, by emphasizing the voice guidance with relatively higher importance when drivers may mistakenly deviate from the optimized route so as to avoid the detour. Another purpose of the present invention is to allow users to easily distinguish voice guidance with relatively higher importance from one with lower importance to avoid danger of distraction when driving.

According to an embodiment of the present invention, an alerting method of a navigation device comprises: (a) determining, by a receiving unit, a current location, receiving a destination inputted by a user, and displaying, by a displaying unit, at least a portion of corresponding map information; (b) planning, by a processing unit, possible routes by computing cost of each possible route, selecting, by the processing unit, the route with minimal cost as an optimized route among the possible routes, regarding, by the processing unit, other possible routes having a relatively higher cost as deviation routes; (c) computing, by the processing unit, a turning cost for each deviation route, wherein the turning cost represents cost difference between each deviation route and the optimized route respectively in an upcoming intersection, on which the possible routes are branched; (d) at a prompter location issuing, by a prompting unit, a voice guidance about how to follow the optimized route, wherein if the upcoming intersection has a turning cost greater than a warning threshold, then the upcoming intersection is a decision point, and additional alertness is issued before the upcoming intersection.

According to another embodiment of the present invention, a navigation device comprises: (a) a storing unit for storing map information comprising a current location and a destination, (b) a processing unit, connected to the storing unit, for planning possible routes, computing the costs of each possible route, determining an optimized route having a lowest cost among the possible routes and regarding other routes having a relatively higher cost as deviation routes, computing a turning cost representing respective cost difference between each deviation route and the optimized route at an intersection, and determining whether to issue additional alertness according to the turning cost, (c) a receiving unit, connected to the processing unit, for receiving signals from satellites to determine a current location, (d) a displaying unit, connected to the processing unit, for displaying at least a portion of corresponding map information, and (e) a prompting unit, connected to the processing unit, for issuing voice guidance about how to follow the optimized route and additional alertness at a prompter location. If the intersection has a turning cost greater than a warning threshold, then the intersection is a decision point, and additional alertness is issued before the intersection.

Users can easily distinguish voice guidance with relatively higher importance from voice guidance with relatively lower importance so that users can decide whether to follow the voice guidance quickly.

DETAILED DESCRIPTION

The present invention will now be described by referring to the accompanying drawings that illustrate the preferred embodiments of the invention. It should be understandable for those skilled in the art, various changes and modifications that may be made to the embodiments should be regarded as without departing from the spirit of the invention.

First, referring to FIG. 1, this is an exemplary block diagram of a navigation device, according to one embodiment. The navigation device 100 comprises (1) a database 101 for storing map information, (2) a processing unit 102 electrically connected to the database 101 for implementing operations according to the map information of the database 101, (3) a receiver 103, electrically connected to the processing unit 102, for receiving signals from the satellites, (4) a display 104, electrically connected to the processing unit 102, for displaying at least a portion of corresponding map information, and (5) a prompter unit 105, electrically connected to the processing unit 102, for issuing voice guidance and additional alertness. Firstly, the receiver 103 obtains signals from a plurality of satellites to locate the current location of the navigation device 100. Then, the processing unit 102 acquires corresponding map information from the database 101 to plan possible routes from the current location to a destination inputted by the user. At least a portion of the corresponding map information comprising the current location of the navigation device 100 is displayed on the display 104. The corresponding map information displayed on the display 104 is changed as the navigation device 100 moves. Map information when driving from the current location to a destination comprises names of roads, the sections and the numbers of roads, the speed-limit of roads, public facilities such as bridges and underground passways, and landmarks (e.g. tour sites, schools and vehicle stations). The two-way algorithm applied to plan possible routes is described hereinafter, moving from the current location and the destination with an opposing direction simultaneously, i.e., moving from the current location in a direction to the destination and moving from the destination in a direction to the current location at the same time. If it moves to an intersection which comprises a plurality of different moveable directions, then it continuously moves forward along these different moveable directions respectively. If the above two opposed directions meet each other at a point of a route, the point is referred to as a convergence point. Thus the route from the current location to the convergence point and from the destination to the convergence point is regarded as a possible route. Therefore, it obtains different possible routes. The processing unit 102 computes the cost for each different possible route such as the distance thereof, and selects the route with minimal cost among all possible routes as an optimized route, and selects the other routes having a relatively higher cost as deviation routes, i.e., routes not totally the same as the optimized route. In general, the optimized route is the route with the shortest distance from the current location to the destination or with the smallest estimated time of arrival (ETA).

In a possible route, there may be one or more intersections that a user may take different choices to take another route that is different from the optimized route. In front of each intersection is provided a prompter location for reminding the user by issuing voice guidance in advance. The voice guidance is used to instruct the user how to follow the optimized route. If the user does not follow the voice guidance of the navigation device 100, the user will deviate from the optimized route. The processing unit 102 computes a turning cost representing the respective cost difference between each deviation route and the optimized route at each intersection. Further the processing unit 102 determines whether the turning cost is greater than a warning threshold such as a specific distance, and sends the result to the prompter unit 105. If the result shows the turning cost is greater than the warning threshold (representing that the importance of the voice guidance is relatively high), the prompter unit 105 at the prompter location issues the voice guidance about how to follow the optimized route and additional alertness such as LED flash, elongated prompting period, extra prompting times, displaying text warnings, vibrations or beep sound, to suggest that the user may substantially deviate from the optimized route if the user does not follow the voice guidance. The intersection having a turning cost greater than the warning threshold is referred to as a decision point. If the result shows the turning cost is not greater than the warning threshold (representing that the importance of the voice guidance is relatively low) at the prompter location, the prompter unit 105 only issues the voice guidance about how to follow the optimized route. The warning threshold may be a default value set in the navigation device 100 or may be inputted by the user. Moreover, if the user doesn't input a warning threshold, the default value will be applied automatically.

Hereinafter refer to FIG. 3 to explain possible routes, wherein a symbol "S" represents a current location and a symbol "D" means a destination, a point "V" is a prompter location, and a point "N" is an intersection. The navigation device 100 plans three possible routes according to the two-way algorithm. The three possible routes are route A represented by the dotted line, route B represented by the solid line, and route C represented by the dashed line. The navigation device 100 computes the cost of route A, route B, and route C, respectively. It should be noted that the portion from the starting point "S" to the intersection "N" is the same (a route with a solid line). The user may choose route A, route B or route C at the intersection "N". Apparently, route B is the optimized route to the destination. Before arriving at the intersection "N", the processing unit 102 computes the turning cost between route A and route B, and between route B and route C, respectively at the intersection "N". Furthermore, a navigation device 100 compares the respective turning cost with the warning threshold, and determines whether the turning cost is greater than the warning threshold or not respectively. If the turning cost is not greater than the warning threshold, the prompter unit 105 only issues the voice guidance about how to follow the route B at the prompter location "V". If the turning cost is greater than the warning threshold, i.e., the intersection "N" is a decision point, the prompter unit 105 issues the voice guidance to instruct the user how to follow route B as well as additional alertness at the prompter location "V".

The warning threshold can be a default value set by the navigation device 100 or inputted by a user. The navigation device 100 applies the default value automatically when a user does not set the warning threshold. Database 101 also comprises a plurality of location information between the current location and the destination, which are sometimes not convergence points. The processing unit 102 reuses the existing optimized routes when planning routes so as not to have re-computation to increase efficiency.

Furthermore, a user can input or change the destination at any time so that the processing unit 102 is able to plan the optimized route dynamically, according to the most updated destination, to determine whether to issue additional alertness at each prompter location "V" or not. Also, the turning cost can be stored in the database 101 so that when the destination and the current location are the same next time, the re-computing of the cost difference is not necessary.

Advantages of the above embodiment are that it only issues additional alertness for voice guidance with relatively higher importance, and thus ignores additional alertness while voice guidance having relatively lower importance, to avoid distraction of a user from receiving too much information. Users can easily determine the importance of the voice guidance, and thus decide whether to follow the voice guidance or not.

FIG. 2 is a flow diagram of an alerting method of a navigation device, according to one embodiment. It can be applied to, but not limited to, the navigation device 100 shown in FIG. 1. After turning on the navigation device 100, the receiver 103 receives signals from a plurality of satellites to determine the current location of the navigation device 100, and a destination is inputted by a user in process 201. At least a portion of the corresponding map information is displayed on the display 104. In process 202, the navigation device 100 plans possible routes according to the two-way algorithm to select the route with minimal cost as an optimized route, whereas the other possible routes with higher costs are regarded as deviation routes. In process 203, before arriving at an upcoming intersection, the navigation device 100 computes the turning cost between each deviation route and the optimized route at the intersection respectively. In process 204, the navigation device 100 determines whether the turning cost is greater than a warning threshold or not. If a result is "YES", i.e., the upcoming intersection is a decision point, the navigation device 100 goes to process 206, at the prompter location issuing navigation voice guidance about how to follow the optimized route and issuing additional alertness before the decision point. If a result is "NO", the navigation device 100 goes to process 205, issuing navigation voice guidance about how to follow the optimized route at the prompter location. The additional alertness is LED flash, elongated prompting period, extra prompting times, displaying text warnings, vibrations or beep sound. Finally, the operation is finished when the user arrives at the destination or turn off the navigation device 100.

In addition, a user is allowed to input or change the destination at any time, i.e., by turning back to process 201. The navigation device 100 thus re-plans the optimized route according to the new destination, and proceeds to the following processes sequentially.

Figure 1:
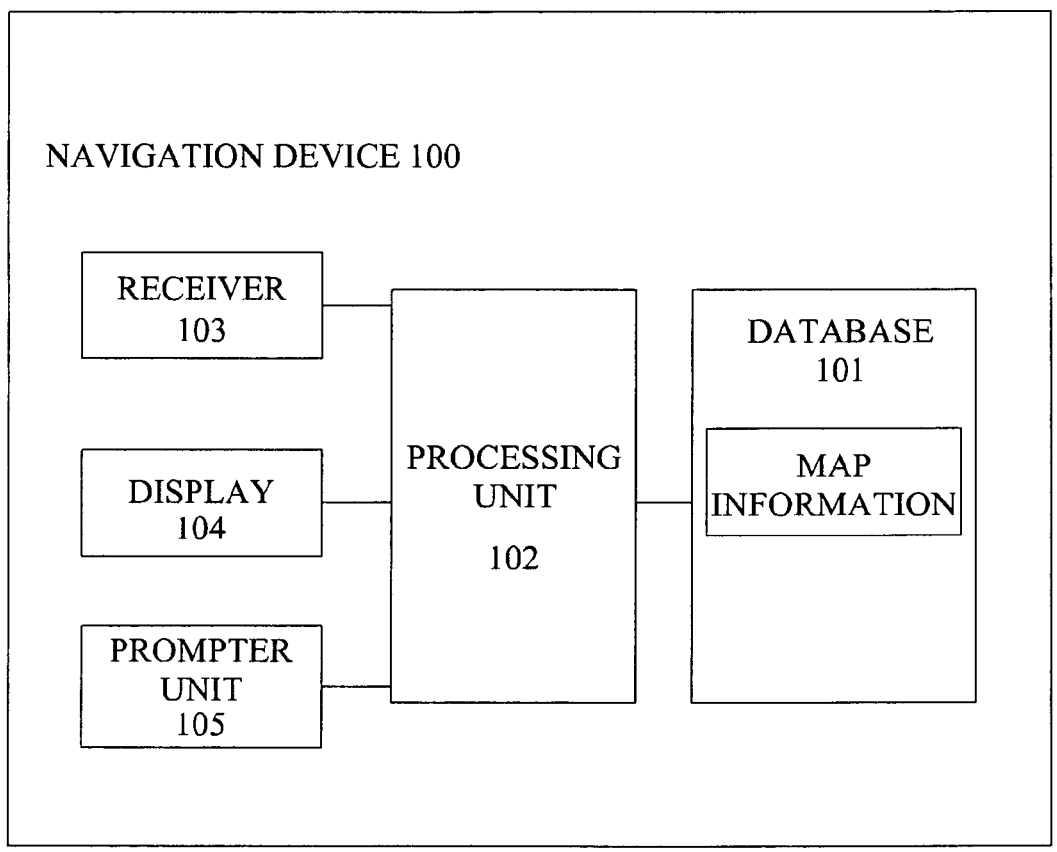
FIG. 1 is an exemplary block diagram of a navigation device of the present invention.
Figure 2:
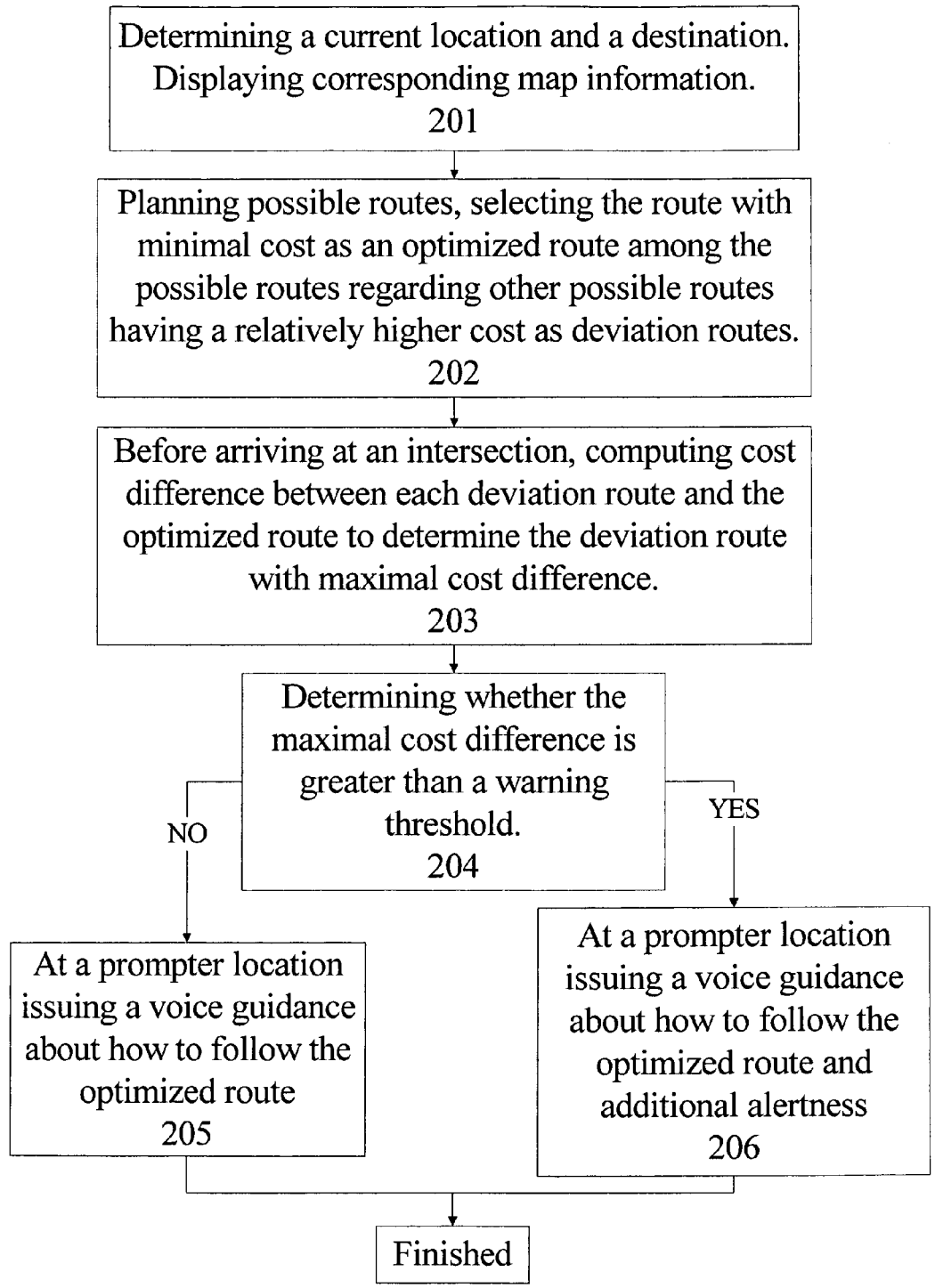
FIG. 2 is a flow diagram of an alerting method of a navigation device according to one embodiment of the present invention.
Figure 3:
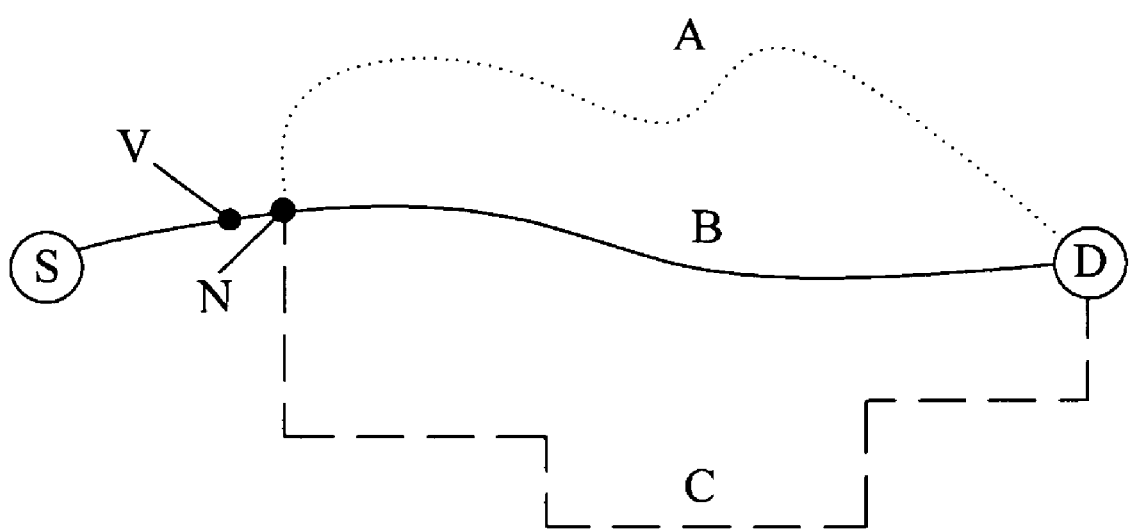
FIG. 3 shows possible routes of an embodiment of the present invention.

The invention claimed is:
1. An alerting method of a navigation device comprising:
  (a) determining, by a receiving unit, a current location, receiving a destination inputted by a user, and displaying, by a displaying unit, at least a portion of corresponding map information;
  (b) planning, by a possible unit, possible routes by computing cost of each possible route, selecting, by the processing unit, the route with minimal cost as an optimized route among the possible routes, regarding, by the processing unit, other possible routes having a relatively higher cost as deviation routes;
  (c) computing, by the processing unit, a turning cost for each deviation route, wherein the turning cost represents cost difference between each deviation route and the optimized route respectively in an upcoming intersection, on which the possible routes are branched;
  (d) at a prompter location issuing, by a voice prompting unit, a voice guidance about how to follow the optimized route,
  wherein if the upcoming intersection has a turning cost greater than a warning threshold, then the upcoming intersection is a decision point, and additional alertness is issued before the upcoming intersection.

2. The alerting method of claim 1, wherein the additional alertness is LED flash, elongated prompting period, extra prompting times, vibrations, displaying text warnings or beep sound.

3. The alerting method of claim 1, wherein the warning threshold can be a default value in the navigation device, or inputted by a user.

4. The alerting method of claim 1, wherein the user is allowed to input new destination or change the destination at any time.

5. The alerting method of claim 1, wherein a prompter location is located in front of each intersection.

6. The alerting method of claim 1, wherein the optimized route is a route with the shortest distance or with the smallest estimated time of arrival (ETA) from the current location to the destination.

7. The alerting method of claim 3, wherein the navigation device applies the default value automatically if the user does not set the warning threshold.

8. A navigation device comprising:
  (a) a storing unit for storing map information comprising a current location and a destination;
  (b) a processing unit, connected to the storing unit, for planning possible routes, computing the costs of each possible route, determining an optimized route having a lowest cost among the possible routes and regarding other routes having a relatively higher cost as deviation routes, computing a turning cost for each deviation route, wherein the turning cost represents at an upcoming intersection, cost difference between each deviation route and the optimized route and determining whether to issue additional alertness according to the turning cost;
  (c) a receiving unit, connected to the processing unit, for receiving signals from satellites to determine a current location;
  (d) a displaying unit, connected to the processing unit, for displaying at least a portion of corresponding map information; and
  (e) a prompting unit, connected to the processing unit, for issuing voice guidance about how to follow the optimized route and additional alertness at a prompter location,
  wherein if the upcoming intersection has a turning cost greater than a warning threshold, the upcoming intersection is a decision point, and additional alertness is issued before the upcoming intersection.

9. The navigation device according to claim 8, wherein the additional alertness is LED flash, elongated prompting period, extra prompting times, vibrations, displaying text warnings on the display or beep sound.

10. The navigation device according to claim 8, wherein the destination can be inputted or changed by a user at any time.

11. The navigation device according to claim 8, wherein a prompter location is located in front of each intersection.

12. The navigation device according to claim 8, wherein the warning threshold is a default value or can be inputted by a user, and the default value is applied automatically as long as the user doesn't input the warning threshold.

13. The navigation device according to claim 8, wherein the optimized route is the route having the shortest distance from the current location to the destination or with the smallest estimated time of arrival (ETA).

* * * * *